United States Patent
Tsukioka

(10) Patent No.: US 8,249,380 B2
(45) Date of Patent: Aug. 21, 2012

(54) IMAGE PROCESSOR AND PROGRAM

(75) Inventor: Taketo Tsukioka, Tokyo (JP)

(73) Assignee: Olympus Corporation, Tokyo (JP)

(*) Notice: Subject to any disclaimer, the term of this patent is extended or adjusted under 35 U.S.C. 154(b) by 271 days.

(21) Appl. No.: 12/752,428

(22) Filed: Apr. 1, 2010

(65) Prior Publication Data

US 2010/0189374 A1    Jul. 29, 2010

Related U.S. Application Data

(63) Continuation of application No. PCT/JP2008/067792, filed on Oct. 1, 2008.

(30) Foreign Application Priority Data

Oct. 5, 2007  (JP) .................................. 2007-261788

(51) Int. Cl.
    *G06K 9/40*    (2006.01)
(52) U.S. Cl. ........................................................ 382/266
(58) Field of Classification Search .................. 382/266, 382/270, 272, 199, 205
    See application file for complete search history.

(56) References Cited

U.S. PATENT DOCUMENTS

| 5,748,796 A * | 5/1998 | Pennino et al. ............... 382/254 |
| 6,754,398 B1 | 6/2004 | Yamada |
| 6,965,695 B2 * | 11/2005 | Yamakawa .................... 382/199 |
| 2006/0132642 A1 | 6/2006 | Hosaka et al. |

FOREIGN PATENT DOCUMENTS

| JP | 08-190628 A | 7/1996 |
| JP | 2001-8038 A | 1/2001 |
| JP | 2001-57677 A | 2/2001 |
| JP | 2002-323567 A | 1/2002 |
| JP | 2006-014164 A | 1/2006 |
| JP | 2006-180268 A | 7/2006 |
| JP | 2006-180269 A | 7/2006 |
| JP | 2006-180271 A | 7/2006 |
| JP | 2006-270523 A | 10/2006 |

* cited by examiner

*Primary Examiner* — Yon Couso
(74) *Attorney, Agent, or Firm* — Holtz, Holtz, Goodman & Chick, PC

(57) ABSTRACT

An object is to provide an image processor for improving the preservability in an edge portion while effectively removing isolated points. Included are an edge judgment section that judges whether an edge exists in a predetermined region specified by a pixel of interest and surrounding pixels of the pixel of interest; a difference calculation section that calculates differences in pixel value between the pixel of interest and the surrounding pixels in the predetermined region; a weight coefficient calculation section that calculates weight coefficients for the respective surrounding pixels from the differences calculated by the difference calculation section, according to a judgment result of the edge judgment section; a weighted averaging section that calculates a weighted average value of the surrounding pixels by using the weight coefficients calculated by the weight coefficient calculation section; and a correction section that corrects the pixel value of the pixel of interest at least one time based on the weighted average value of the surrounding pixels calculated by the weighted averaging section, the pixel value of the pixel of interest, and the judgment result of the edge judgment section.

19 Claims, 14 Drawing Sheets

FIG. 15A
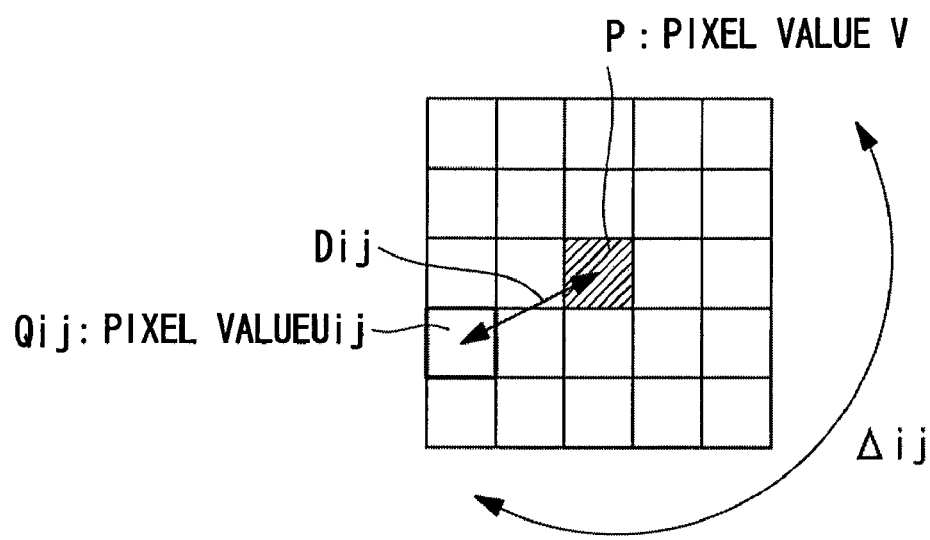
FIG. 15B
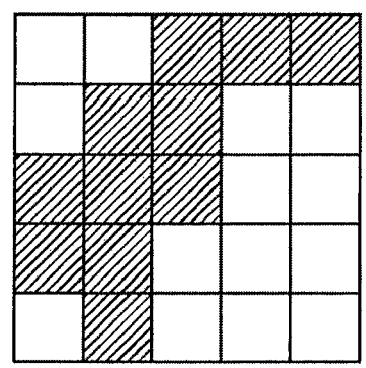
FIG. 15C
| 0 | 0 | 0.6 | 0.6 | 0.5 |
|---|---|---|---|---|
| 0 | 0.8 | 1 | 0.3 | 0 |
| 0.6 | 1 | 1 | 0.3 | 0 |
| 0.6 | 0.7 | 0.3 | 0.3 | 0 |
| 0 | 0.6 | 0 | 0 | 0 |

IMAGE PROCESSOR AND PROGRAM

CROSS REFERENCE TO RELATED APPLICATIONS

This is a continuation of International Application PCT/JP/2008/067792, with an international filing date of Oct. 1, 2008, which is hereby incorporated by reference herein in its entirety. This application claims the benefit of Japanese Patent Application No. 2007-261788, the content of which is incorporated herein by reference.

BACKGROUND OF THE INVENTION

1. Field of the Invention

The present invention relates to image processing, and more particularly, to an image processor and a program for removing noise in images.

2. Description of Related Art

With a recent increase in the number of pixels of image acquisition devices, noise superimposed in images acquired by image acquisition apparatuses, such as digital cameras, tends to increase. Various technologies have been conventionally conceived as methods for removing such noise. As a relatively new technology among them, a bilateral filter has been proposed (for example, see Japanese Unexamined Patent Applications, Publication Nos. 2006-14164 and Hei 8-190628).

BRIEF SUMMARY OF THE INVENTION

However, in such a noise reduction method for calculating a weighted average of surrounding pixels, there is a problem in that isolated noise, in particular, is likely to unremoved.

Further, there is a problem in that the edge portion is more blurred when noise reduction processing is repeatedly performed with the aim of improving the noise reduction effect.

The present invention has been made in view of the above-described problems, and an object thereof is to provide an image processor and a program for improving the preservability in an edge portion while effectively removing isolated points.

In order to solve the above-described problems, the present invention adopts the following solutions.

According to a first aspect, the present invention provides an image processor including: an edge judgment section that judges whether an edge exists in a predetermined region specified by a pixel of interest and surrounding pixels of the pixel of interest; a difference calculation section that calculates differences in pixel value between the pixel of interest and the surrounding pixels in the predetermined region; a weight coefficient calculation section that calculates weight coefficients for the respective surrounding pixels from the differences calculated by the difference calculation section, according to a judgment result of the edge judgment section; a weighted averaging section that calculates a weighted average value of the surrounding pixels by using the weight coefficients calculated by the weight coefficient calculation section; and a correction section that corrects the pixel value of the pixel of interest at least one time based on the weighted average value of the surrounding pixels calculated by the weighted averaging section, the pixel value of the pixel of interest, and the judgment result of the edge judgment section.

According to the first aspect, edge judgment is performed, and a weighted average is calculated using the weight coefficients according to the judgment result, thereby performing noise reduction. Further, the pixel value of the pixel of interest is corrected according to the result of the edge judgment, and noise reduction processing is repeated at least one time by using the corrected pixel of interest. Thus, since appropriate noise reduction can be performed in an edge portion and in a flat portion, it is possible to perform noise reduction such that an isolated point is unlikely to remain in the flat portion and to perform noise reduction while preserving an edge in the edge portion.

According to a second aspect, the present invention provides an image processing program causing a computer to execute: edge judgment processing of judging whether an edge exists in a predetermined region specified by a pixel of interest and surrounding pixels of the pixel of interest; difference calculation processing of calculating differences in pixel value between the pixel of interest and the surrounding pixels in the predetermined region; weight coefficient calculation processing of calculating weight coefficients for the respective surrounding pixels from the differences calculated by the difference calculation processing, according to a judgment result of the edge judgment processing; weighted average processing of calculating a weighted average value of the surrounding pixels by using the weight coefficients calculated by the weight coefficient calculation processing; and correction processing of correcting the pixel value of the pixel of interest at least one time based on the weighted average value of the surrounding pixels calculated by the weighted average processing, the pixel value of the pixel of interest, and the judgment result of the edge judgment processing.

According to the present invention, it is possible to perform noise reduction such that an isolated point is unlikely to remain in the flat portion and to perform noise reduction while preserving an edge in the edge portion.

BRIEF DESCRIPTION OF THE SEVERAL VIEWS OF THE DRAWINGS

FIG. 15A is an explanatory diagram of a conventional technology.

FIG. 15B is an explanatory diagram of the conventional technology.

FIG. 15C is an explanatory diagram of the conventional technology.

DETAILED DESCRIPTION OF THE INVENTION

First Embodiment

An image processor according to a first embodiment of the present invention will be described below with reference to the drawings.

Figure 1:
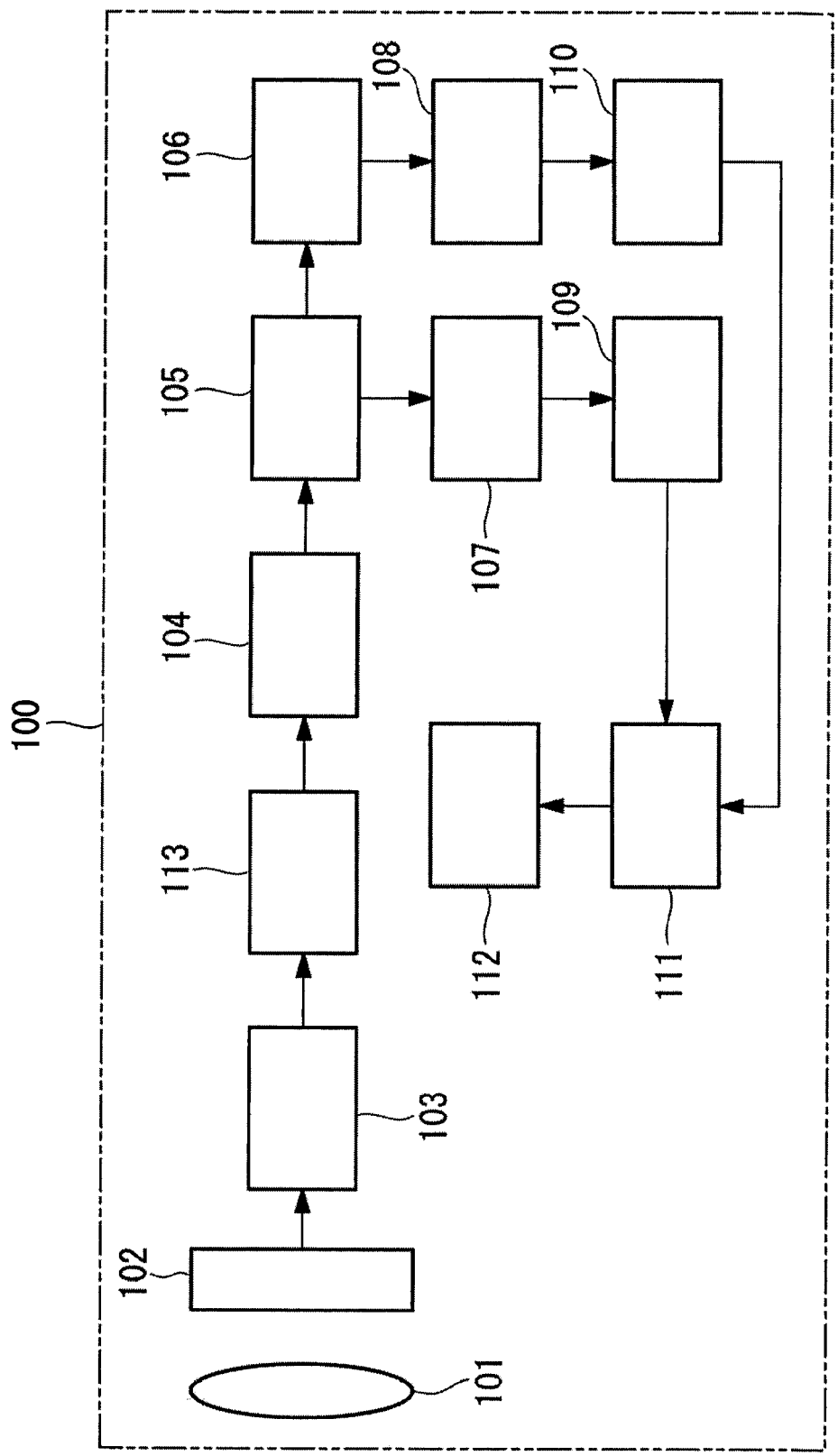
FIG. 1 is a configuration diagram of an image acquisition apparatus according to a first embodiment.

FIG. 1 is a configuration diagram of an image acquisition apparatus 100 that includes the image processor according to this embodiment.

The image acquisition apparatus 100 includes an optical system 101, a single-plane image acquisition device 102, an analog/digital conversion section 103, an interpolation section 104, a color conversion section 105, a luminance level conversion section 106, a color level conversion section 107, an edge enhancement section 108, a color noise reduction section 109, a luminance noise reduction section 110, a compression section 111, a recording section 112, and a buffer 113.

The single-plane image acquisition device 102 is connected to the color conversion section 105 via the analog/digital conversion section 103, the buffer 113, and the interpolation section 104, in this order. The color conversion section 105 is connected to the compression section 111 via the luminance level conversion section 106, the edge enhancement section 108, and the luminance noise reduction section 110, and is also connected to the compression section 111 via the color level conversion section 107 and the color noise reduction section 109. The compression section 111 is connected to the recording section 112.

Figure 2:
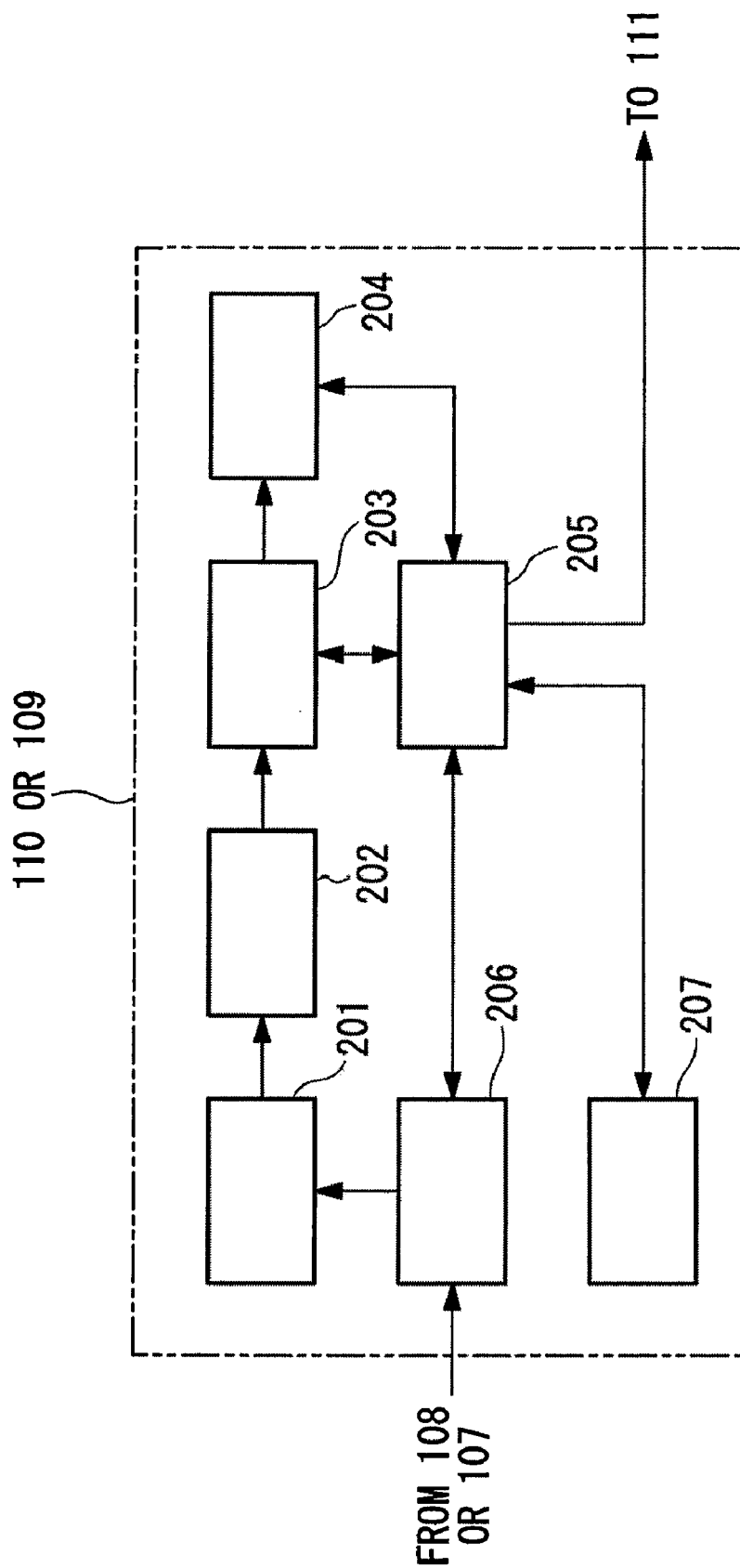
FIG. 2 is a configuration diagram of a color noise reduction section and a luminance noise reduction section shown in FIG. 1.

As shown in FIG. 2, the luminance noise reduction section 110 and the color noise reduction section 109 have the same configuration and include a reduction section (reduction means) 201, an edge extraction section (edge judgment means) 202, a weight calculation section (weight coefficient calculation means) 203, a weighted averaging section (weighted average means) 204, a buffer A 206, a buffer B 207, and a correction section (correction means) 205.

The edge enhancement section 108 is connected to the buffer A 206 of the luminance noise reduction section 110, and the color level conversion section 107 is connected to the buffer A 206 of the color noise reduction section 109. In each of the luminance noise reduction section 110 and the color noise reduction section 109, the reduction section 201 is connected to the buffer A 206 and the edge extraction section 202, the edge extraction section 202 is connected to the weight calculation section 203, and the weight calculation section 203 is connected to the weighted averaging section 204. Further, the correction section 205 is bi-directionally connected to the weight calculation section 203, the weighted averaging section 204, the buffer A 206, and the buffer B 207; and the correction section 205 is also connected to the compression section 111.

Next, the operation of the image acquisition apparatus 100 will be described.

When a shutter button (not shown) is pressed, an optical image formed by the optical system 101 is converted into an electrical signal by the single-plane image acquisition device 102, is further A/D-converted by the analog/digital conversion section 103, and is stored in the buffer 113 as a digital image in which one color component is obtained for each pixel.

The interpolation section 104 performs, for each pixel of the digital image stored in the buffer 113, interpolation processing of reading pixel values in a predetermined adjacent range and compensating for missing color components at the pixel. Note that known interpolation processing is performed here, in which the weighted average of the pixel values of surrounding pixels that contain the color components missing at the pixel of interest is calculated to generate the values of the color components missing at the pixel of interest. RGB values obtained at each pixel as a result of the processing of the interpolation section 104 are next output to the color conversion section 105.

The color conversion section 105 adjusts the RGB values obtained at each pixel, by using a 3×3 matrix, converts the results into a luminance component Y and color-difference components Cr and Cb, and outputs the luminance component to the luminance level conversion section 106 and the color-difference components to the color level conversion section 107.

The color level conversion section 107 applies gamma processing to the color-difference components and outputs the processing results to the buffer A 206 of the color noise reduction section 109. On the other hand, the luminance level conversion section 106 applies gamma processing to the luminance component and outputs the result to the edge enhancement section 108. The edge enhancement section 108 applies known edge enhancement processing, such as an unsharp mask, to the luminance component subjected to the gamma processing and outputs the result to the buffer A 206 of the luminance noise reduction section 110.

When the above-described processing has finished for all pixels in the digital image stored in the buffer 113, two images, i.e., an image (hereinafter, referred to as "Cr image") that has, as pixel values, the color-difference components Cr to which color noise reduction has not been applied and an image (hereinafter, referred to as "Cb image") that has, as pixel values, the color-difference components Cb to which color noise reduction has not been applied, are accumulated in the buffer A 206 of the color noise reduction section 109. Also, an image (hereinafter, referred to as luminance image) that has, as pixel values, the luminance components Y to which luminance noise reduction has not been applied is accumulated in the buffer A 206 of the luminance noise reduction section 110.

Then, the color noise reduction section 109 applies color noise reduction processing to each of the Cr image and the Cb image in its buffer A 206 and outputs the images which has been subjected to the color noise reduction to the compression section 111. The luminance noise reduction section 110 applies luminance noise reduction processing to the luminance image in its buffer A 206 and outputs the luminance image which has been subjected to the luminance noise reduction to the compression section 111 as well.

The compression section 111 converts and compresses the Cr image and the Cb image which have both been subjected to the color noise reduction and the luminance image which has been subjected to the luminance noise reduction, to a predetermined encoded data format and outputs the data to the recording section 112. The recording section 112 records the data encoded and compressed by the compression section 111 on a recording medium.

Next, the operations of the color noise reduction section 109 and the luminance noise reduction section 110 will be described in detail.

Note that the processing applied by the color noise reduction section 109 to each of the Cr and Cb images in its buffer A 206 is basically the same as the processing applied by the luminance noise reduction section 110 to the luminance image in its buffer A 206, and only processing parameters are different. Therefore, the operation of the luminance noise reduction section 110 will be mainly described below, and the operation of the color noise reduction section 109 will not be described except for the differences therefrom.

In the luminance noise reduction section 110, the reduction section 201 first applies known reduction processing to the luminance image in the buffer A 206 to make it one M-th the size (M is a constant) and outputs the reduced luminance image to the edge extraction section 202. The edge extraction section 202 applies known edge extraction processing to the reduced luminance image and calculates, from an extraction result $E(x_s, y_s)$ of each pixel $(x_s, y_s)$ in the reduced image, an edge index $\alpha(x_s, y_s)$ that indicates the degree to which edges are present in each pixel as in Expression (1), and stores it in its buffer.

$$\alpha(x_s, y_s) = f(E(x_s, y_s)) \quad (1)$$

Figure 3:
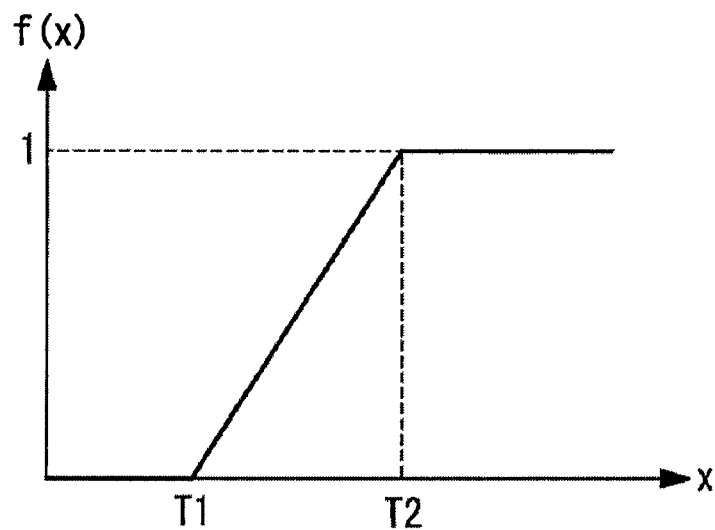
FIG. 3 is a diagram of a function used to calculate an edge index.

Here, the function f(x) is 0 when the input value is a predetermined value or less, is 1 when the input value is a predetermined value or more, and transits smoothly when the input value falls within the range between the predetermined values, as shown in FIG. 3. In this way, since 0 is held when the input value is the predetermined value or less, it is possible to set an edge index while alleviating the effect of noise included in the reduced image.

Next, the correction section 205, the weight calculation section 203, and the weighted averaging section 204 cooperate to perform processing. At this time, a series of identical-flow processing (hereinafter, referred to as "cooperative processing") is repeatedly performed a predetermined number of times that is specified depending on the degree of noise of the image in the buffer A 206.

In each round of the cooperative processing, an image is read from the buffer A 206 or the buffer B 207, whichever serves as an input buffer, the processing is performed, and the processing result is output to the other buffer which is not the buffer from which the image is read. Specifically, when an image is read from the buffer A 206, the processing result is output to the buffer B 207; and, when an image is read from the buffer B 207, the processing result is output to the buffer A 206. Then, the next round of the cooperative processing is performed with the buffer to which the previous processing result has been output serving as the input buffer. The above-described operations are repeated. Note that the buffer A 206 serves as the input buffer in the initial processing.

In each round of the cooperative processing, the following processes are performed for each pixel of interest P of the image in the input buffer.

First, the correction section 205 reads the pixel value V of the pixel of interest P and the pixel values $U_{ij}$ of 3×3 adjacent pixels around the pixel of interest P and holds them in its buffer. It is assumed here that i and j each indicate a relative coordinate from the pixel of interest P and are −1, 0, or 1, and i and j are not 0 at the same time.

Next, for each surrounding pixel, the difference $D_{ij}$ from the pixel of interest is calculated by $D_{ij} = |V - U_{ij}|$, and the calculation result $D_{ij}$ and the coordinates (x, y) of P are output to the weight calculation section 203.

The weight calculation section 203 calculates an edge index $\alpha'$ for the coordinates (x, y) of P from the edge index $\alpha(x_s, y_s)$ of the reduced image held in the edge extraction section 202 and calculates, according to the calculated edge index $\alpha'$, a weight coefficient $W_{ij}$ for the received $D_{ij}$.

Figure 4:
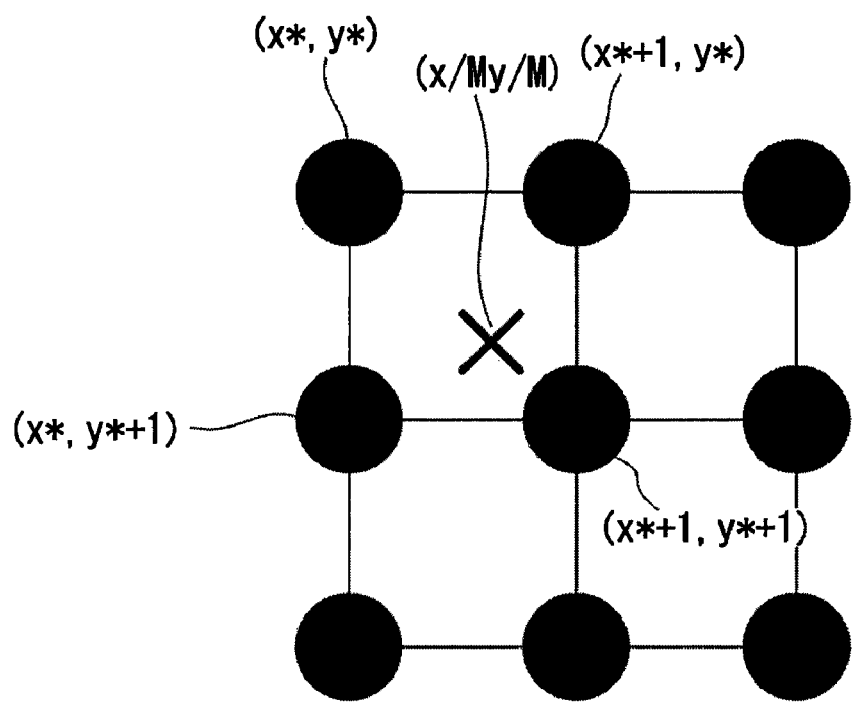
FIG. 4 is an explanatory diagram of interpolation processing performed when the edge index is calculated.

Here, for example, four points (x*, y*), (x*+1, y*), (x*, y*+1), and (x*+1, y*+1) that surround the coordinates (x/M, y/M) are specified in the reduced image, as shown in FIG. 4, and the edge index $\alpha'$ is calculated from the edge indexes of the respective points, as in Expression (2).

$$\alpha' = (1-c_2)*(1-c_1)*\alpha(x^*, y^*) + (1-c_1)*c_2*\alpha(x^*, y^*+1) + (1-c_2)*c_1*\alpha(x^*+1, y^*) + c_1*c_2*\alpha(x^*+1, y^*+1)$$

$$c_1 = x/M - x^*$$

$$c_2 = y/M - y^* \quad (2)$$

Figure 5A:
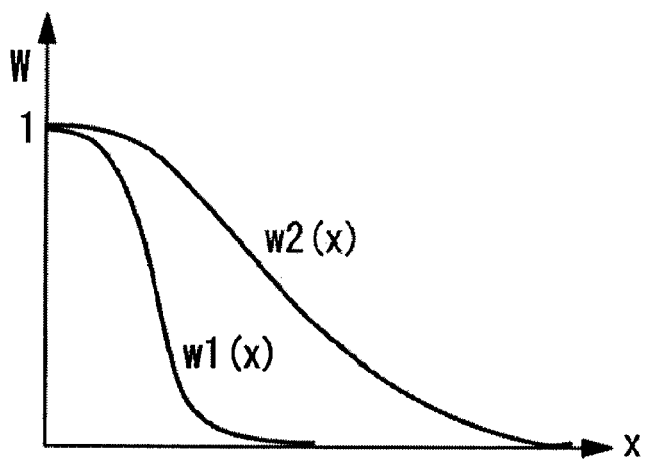
FIG. 5A is a diagram of functions used for noise reduction processing.

Further, the weight coefficient $W_{ij}$ for each surrounding pixel is calculated as in Expression (3):

$$W_{ij} = \alpha'*w_1(D_{ij}) + (1-\alpha')*w_2(D_{ij}) \quad (3)$$

wherein $w_1(x)$ and $w_2(x)$ are weighting functions shown in FIG. 5A, $w_1(x)$ is a function rapidly approaching 0 when an input value x is larger than a particular value, and $w_2(x)$ is a function reducing gradually with respect to the input value x. Note that the meaning of the calculation of Expression (3) will be described below.

Figure 6:
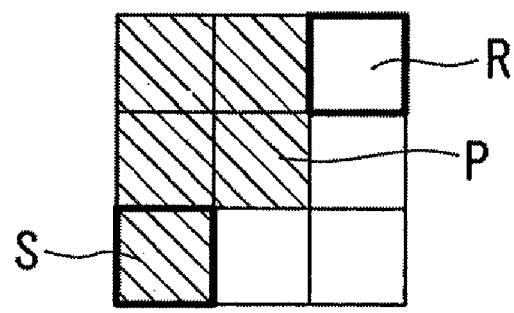
FIG. 6 is an explanatory diagram of control performed according to an edge index obtained from a weighting function.

In general, in an edge portion of an image, the difference in pixel value between pixels located along the edge is small and the difference in pixel value between pixels located across the edge is large. In contrast to this, since Expression (3) calculates a weight coefficient by a weighting function having a steep characteristic close to that of $w_1(x)$ in a portion where an edge is detected in the reduced image, the difference in difference magnitude is reflected in the weight coefficients. As a result, the weight coefficient for a pixel (for example, S in FIG. 6) that is located at the same side of the edge as the pixel of interest P becomes large, and the weight coefficient for a pixel (for example, R in FIG. 6) that is located at a different side of the edge becomes small.

On the other hand, in a flat portion of the image, the difference fluctuates due to the effect of noise, but the degree thereof is smaller than that in the edge portion, and the differences with respect to the surrounding pixels tend to be distributed in a certain narrow range. In contrast to this, since Expression (3) calculates a weight coefficient by a weighting function having a characteristic close to that of $w_2(x)$ in a portion that is judged to be flat because an edge is not detected in the reduced image, the values of the weight coefficients are close among the surrounding pixels irrespective of some difference fluctuation.

As described above, the weight calculation section 203 calculates the weight $W_{ij}$ such that the amount of change in the weight coefficient for neighborhoods is changed depending on the presence or absence of an edge, and outputs it to the weighted averaging section 204. Also, the edge index $\alpha'$ for the coordinates (x, y) is output to the correction section 205.

When the weight $W_{ij}$ is received, the weighted averaging section 204 reads the pixel values $U_{ij}$ of the surrounding pixels held in the correction section 205 and smoothes them by calculating the weighted average. Then, a smoothing result V' is output to the correction section 205.

$$V'=(V+\Sigma_{ij}(U_{ij}*W_{ij}))/(1+\Sigma_{ij}W_{ij}) \quad (4)$$

It is assumed here that, in Expression (4), the sum is calculated for all combinations of i and j, each of which is −1, 0, or 1, and both of which are not 0 at the same time.

When the smoothing result V' is received from the weighted averaging section 204, the correction section 205 calculates a new pixel value V" of the pixel of interest by using the edge index α' received from the weight calculation section 203, as in the following expression.

$$V''=V \text{ (when } N \text{ is larger than } N')$$

$$V''=V+\beta*(V'-V) \text{ (when } N \text{ is equal to or smaller than } N')$$

$$N'=\text{ceil}(N''*g(\alpha'))$$

$$\beta=h(\alpha') \quad (5)$$

Then, V" is output to a pixel location corresponding to the pixel of interest P in the buffer that does not serve as the input buffer, and the cooperative processing for the pixel of interest P is ended.

Figure 5B:
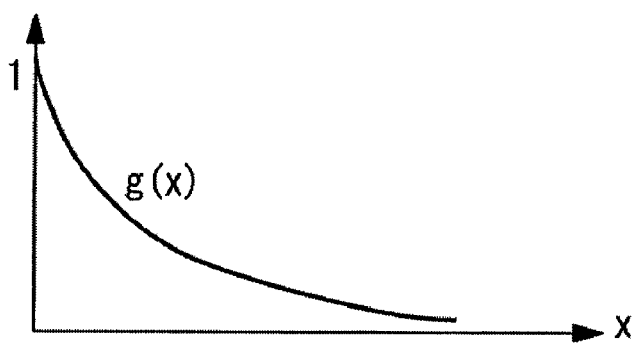
FIG. 5B is a diagram of a function used for the noise reduction processing.
Figure 5C:
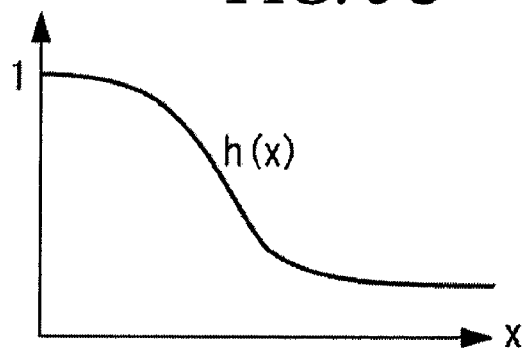
FIG. 5C is a diagram of a function used for the noise reduction processing.

Here, g(x) and h(x) are functions shown in FIG. 5B and FIG. 5C and both decrease with respect to an input value x. Further, N is a counter indicating the repetition count of the cooperative processing performed so far, and is held in the correction section 205. N" is specified in advance as the maximum repetition count of the cooperative processing, and ceil(x) indicates the minimum integer that is equal to or larger than the input value x.

As a result of the processing of Expression (5), the closer the edge index α' is to 0, the closer V" is to the smoothing result V', and the value is updated as the cooperative processing is repeated. On the other hand, when the edge index α' is close to 1, V" is close to the original pixel value V of the pixel of interest P, and a change in value is reduced even when the cooperative processing is repeatedly performed. As a result, an advantage is afforded in that the values in an edge portion are not smoothed much even when the cooperative processing is repeated, and the values in a flat portion are smoothed more every time the cooperative processing is repeated.

The correction section 205 selects a next pixel of interest continuously from the input buffer in raster order and repeats the above-described series of processing. When the processing has finished for all pixels in the input buffer, the cooperative processing is ended, and the correction section 205 increments the counter N indicating a repetition count, held therein, by 1.

Then, when N exceeds the maximum repetition count N" of the cooperative processing, specified in advance, the image in the buffer that serves as the output buffer in the last cooperative processing is output to the compression section 111.

The operation of the luminance noise reduction section 110 has been described above; and the same processing is also performed in the color noise reduction section 109 for the Cr image first and for the Cb image next. However, a reduction ratio M used in the reduction section 201, thresholds $T_1$ and $T_2$ used for the edge index calculation shown in FIG. 3, the shapes of the functions $w_1(x)$, $w_2(x)$, g(x), and h(x) shown in FIG. 5A-5D, and the maximum repetition count N" are different from those of the luminance noise reduction section 110.

Note that this embodiment is not limited to the above-described specific example, and various modifications can be made.

For example, an edge index is calculated for the image reduced by the reduction section 201 in this embodiment; but an edge index may be calculated directly from the image in the buffer A 206 by any known method with a low probability of detecting an isolated point as an edge. For example, it is preferable to use a Laplacian-Gaussian filter that simultaneously performs edge detection and smoothing.

Figure 5D:
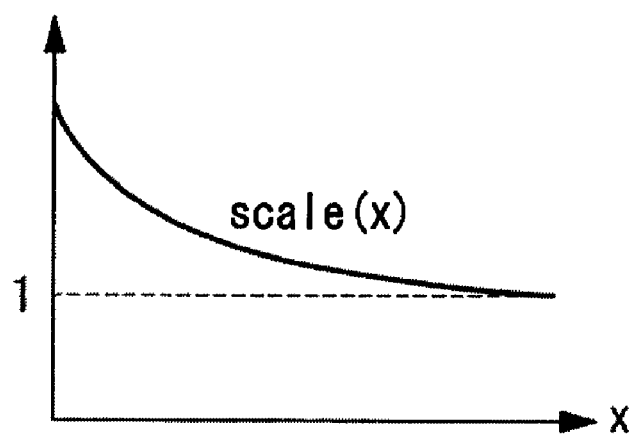
FIG. 5D is a diagram of a function used for noise reduction processing.

Furthermore, for the weight calculation in the weight calculation section 203, the following method may be used instead of Expression (3):

$$W_{ij}=w_1(D_{ij}*\text{scale}(\alpha')) \quad (6)$$

wherein $w_1(x)$ is the function shown in FIG. 5A, and scale (x) is a function shown in FIG. 5D, which is a decreasing function with respect to an input value.

As a result of the above-described calculation, at a location where the edge index α' is small, an input value for $w_1(x)$ becomes large, and, as a result of the shape of $w_1(x)$, the fluctuation of a calculated weight coefficient becomes small with respect to the fluctuation of the value $D_{ij}$. In contrast, at a location where the edge index α' is large, the fluctuation of a calculated weight coefficient becomes relatively large with respect to the fluctuation of the value $D_{ij}$, and the same qualitative result as that of Expression (3) can be obtained.

Furthermore, in the edge extraction of the edge extraction section 202, a known noise reduction method may be used to reduce the effect of noise instead of giving 0 in Expression (1) when the edge extraction result is equal to or less than the predetermined value.

Further, although this embodiment is implemented by hardware, the same processing can also be realized by software.

Figure 7:
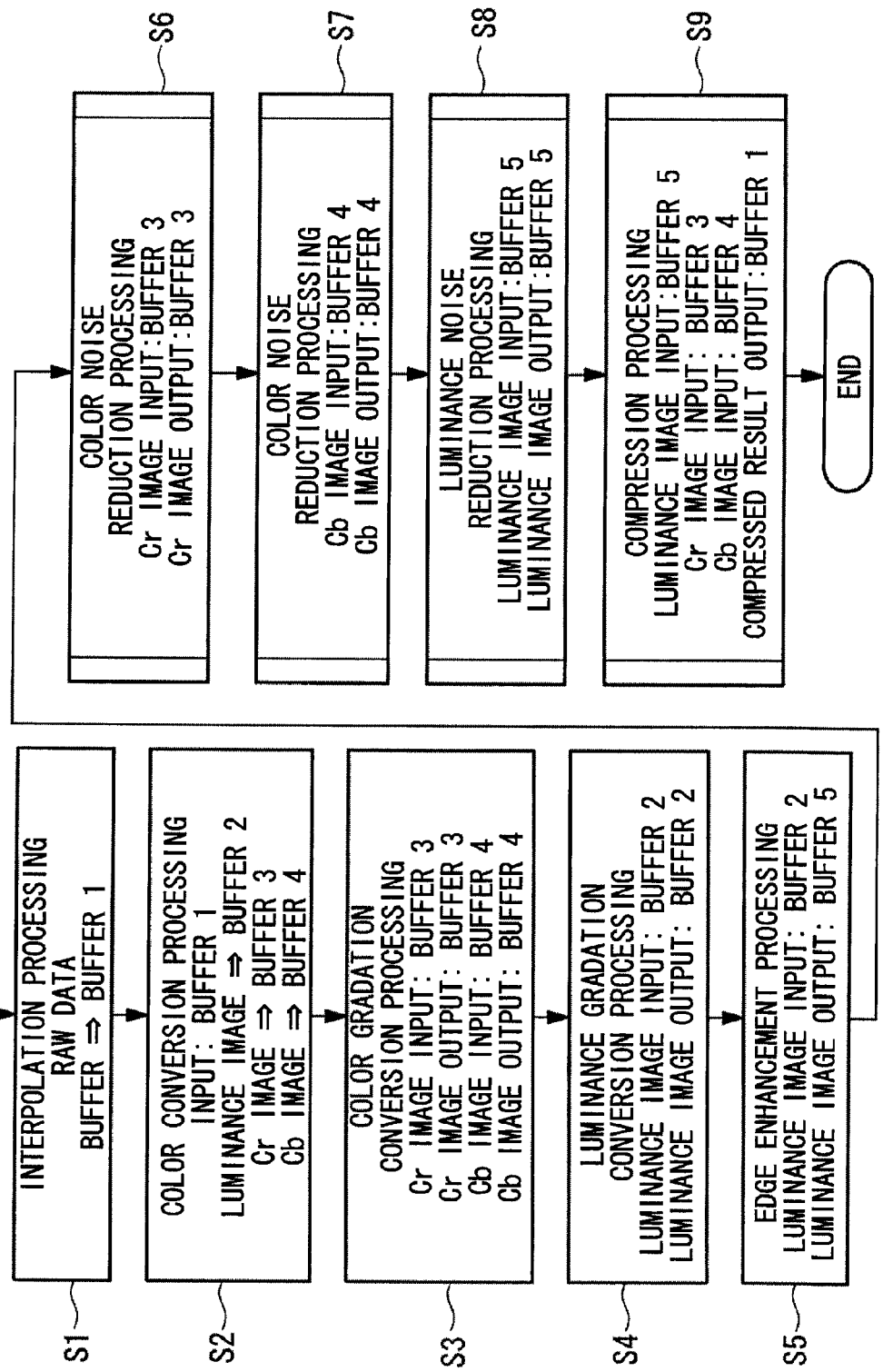
FIG. 7 is a software flow of the first embodiment.
Figure 8:
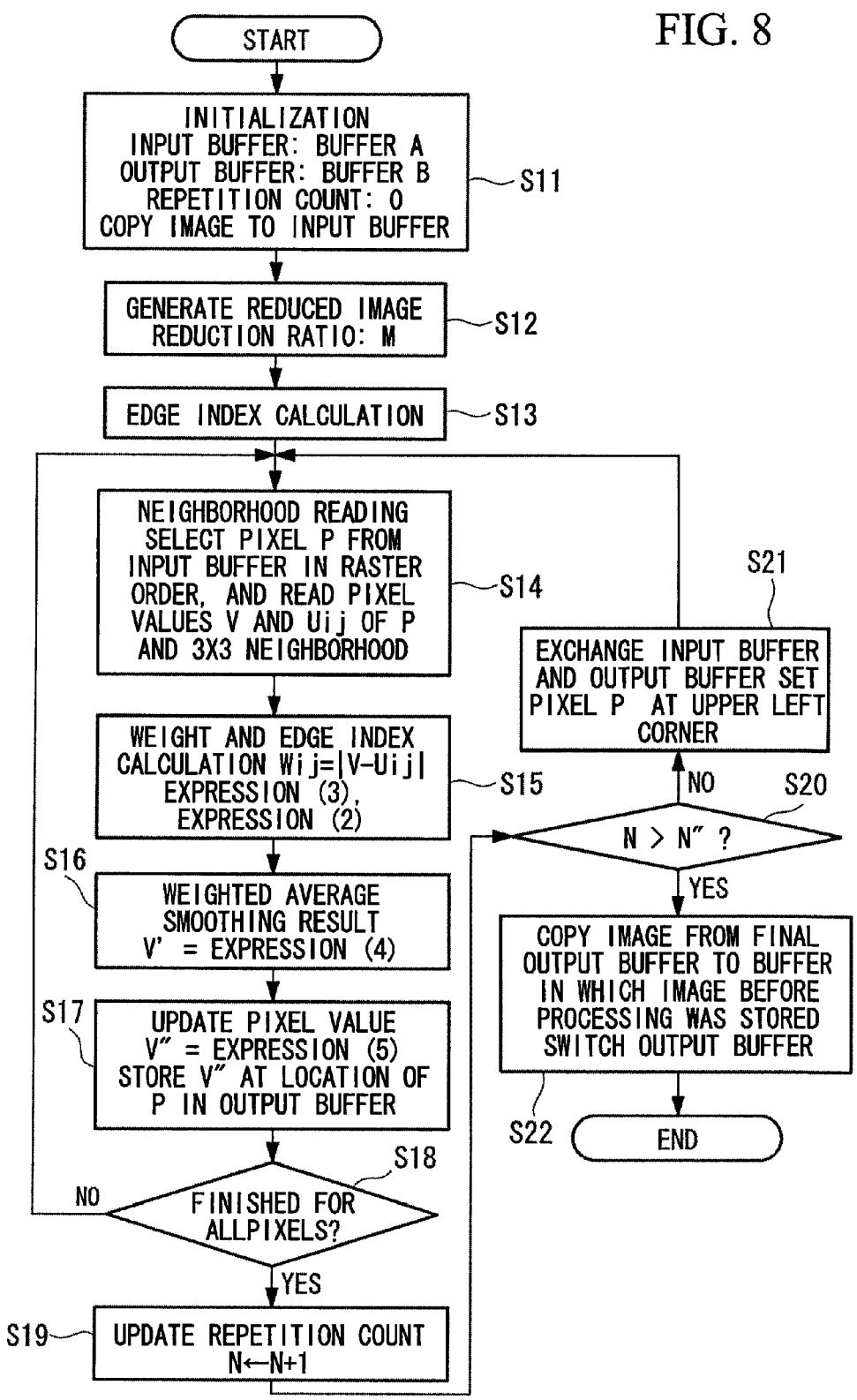
FIG. 8 is a software flow of the noise reduction processing in the flow shown in FIG. 7.

Flows shown in FIGS. 7 and 8 are based on the assumption that a single-plane image is stored in a RAW data buffer provided in a RAM of a PC, as in the buffer 113 shown in FIG. 1.

The flow shown in FIG. 7 will be described below.

First, it is assumed that buffers used during the processing are similarly provided in the RAM of the PC.

In S1, the same interpolation processing as that of the interpolation section 104 is applied to the single-plane image in the RAW data buffer, and a resultant color (RGB) image is stored in a buffer 1.

In S2, the color image is read from the buffer 1, the same color conversion processing as that of the color conversion section 105 is applied thereto, a luminance image is output to a buffer 2, a Cr image is output to a buffer 3, and a Cb image is output to a buffer 4.

In S3, the Cr image is read from the buffer 3, is subjected to the same γ processing as that of the color level conversion section 107, and is overwritten to the buffer 3. Also, the Cb image is read from the buffer 4, is subjected to the same γ processing as that of the color level conversion section 107, and is overwritten to the buffer 4.

In S4, the luminance image is read from the buffer 2, is subjected to the same γ processing as that of the luminance level conversion section 106, and is overwritten to the buffer 2.

In S5, the luminance image is read from the buffer 2, is subjected to the same edge enhancement processing as that of the edge enhancement section 108, and is output to a buffer 5.

In S6, the same color noise reduction processing as that of the color noise reduction section 109 is applied to the Cr image in the buffer 3, and the result is overwritten to the buffer 3.

In S7, the same color noise reduction processing as that of the color noise reduction section 109 is applied to the Cb image in the buffer 4, and the result is overwritten to the buffer 4.

In S8, the same luminance noise reduction processing as that of the luminance noise reduction section 110 is applied to the luminance image in the buffer 5, and the result is overwritten to the buffer 5.

In S9, the noise-reduced luminance image in the buffer 5, the noise-reduced Cr image in the buffer 3, and the noise-reduced Cb image in the buffer 4 are read and are subjected to the same encoding and compression processing as that of the compression section 111, and the results are overwritten to the buffer 1.

As a result of the above-described processing, the same image as that recorded in the recording section 112 is obtained in the buffer 1.

Next, the flow of the noise reduction processing performed in S6, S7, and S8 will be described using FIG. 8.

In this flow, buffer A and buffer B are additionally prepared in the RAM.

In S11, the buffer A is specified as an input buffer, the buffer B is specified as an output buffer, and an image to be subjected to noise reduction is copied to the buffer A. The repetition count is initialized to 0.

In S12, the image is read from the buffer A, and a reduced image is generated at the reduction ratio M by the same processing as in the reduction section 201. In S13, an edge is extracted from the reduced image by the same processing as in the edge extraction section 202, and the edge index α for the reduced image is calculated by Expression (1).

In S14, by the same processing as in the correction section 205, an unprocessed pixel of interest P is selected in raster order in the input buffer, and the pixel value V thereof and the pixel values $U_{ij}$ of 3×3 surrounding pixels of the pixel of interest P are read.

In S15, the difference $D_{ij}$ is calculated as in the correction section 205, and the edge index α' is calculated by Expression (2) and the weight coefficient $W_{ij}$ is calculated by Expression (3) as in the weight calculation section 203.

In S16, the weighted average is calculated to calculate the smoothing result V' by Expression (4), as in the weighted averaging section 204.

In S17, a new pixel value V" of the pixel of interest P is calculated by Expression (5) as in the correction section 205. Further, the calculation result is stored at a coordinate location corresponding to P in the output buffer.

In S18, it is judged whether the processing has finished for all pixels in the input buffer. If the processing has not finished, the flow returns to S14. If the processing has finished, the flow advances to S19.

In S19, the repetition count is incremented by 1.

In S20, it is judged whether the repetition count has exceeded the maximum repetition count N". If the repetition count has exceeded the maximum repetition count N", the flow advances to S22. If the repetition count has not exceeded the maximum repetition count N", the flow advances to S21.

In S21, the input buffer and the output buffer are exchanged (if the buffer A has been used for input and the buffer B has been used for output, the buffer B will be used for input and the buffer A will be used for output), and the pixel of interest P to be subjected to the processing is reset to the upper left corner of the image in the input buffer. Then, the flow advances to S14.

In S22, the image is copied from the buffer serving as the output buffer to the copy-resource memory area from which the image has been copied to the buffer A in S11, and the entire noise-reduction processing is ended.

In both of the above-described configurations using software and hardware, the threshold $T_1$ used for the edge index calculation, the maximum repetition count N", and the shapes of the weighting functions $w_1(x)$ and $w_2(x)$ are constants to be specified depending on the amount of noise in an input image.

Note that these constants can also be specified in accordance with the noise level of an input image. For example, the noise characteristic of the single-plane image acquisition device 102 is measured in advance with respect to the ISO sensitivity, and the above-described constants are set appropriately for each level of the ISO sensitivity and stored in a table, so that the most appropriate noise reduction can be performed for ISO sensitivity information used at the time of image acquisition.

As described above, according to the image processor of this embodiment, edge judgment is performed, and weight coefficients according to the judgment result are used for the weighted average calculation, thus performing noise reduction. Further, the pixel value of the pixel of interest is corrected according to the result of the edge judgment, and the noise reduction processing is repeated at least one time by using the corrected pixel of interest. Thus, appropriate noise reduction can be performed in an edge portion and in a flat portion, so that it is possible to perform noise reduction such that an isolated point is unlikely to remain in the flat portion and to perform noise reduction while preserving an edge in the edge portion.

Furthermore, the edge judgment is performed after the image is reduced, thereby allowing an edge portion and a flat portion to be judged efficiently while preventing an isolated point from being judged as an edge.

Further, the amount of change in the weight coefficient is increased in a region judged to be an edge and is reduced in a region judged to be flat, thereby improving the smoothing ability in the flat portion and improving the edge preservability in the edge portion.

Further, a weighting function having a small amount of change with respect to the differences in pixel value between the pixel of interest and surrounding pixels and a weighting function having a large amount of change with respect to the above-described differences are combined depending on the judgment result of the edge extraction section 202, so that the weight coefficient can be adjusted separately for the edge portion and the flat portion.

Further, since the magnitudes of the above-described differences are amplified depending on the edge judgment result, the amount of change in the weight coefficient can be controlled according to the edge judgment by very simple processing.

Further, since the number of times the pixel value of the pixel of interest is corrected is reduced in a region judged to be an edge and is increased in a region judged to be flat, the noise reduction processing is repeated more in the flat portion, thus improving the performance of the noise reduction processing.

Further, since the amount of correction of the pixel value of the pixel of interest in each iteration of correction processing is reduced in a region judged to be an edge and is increased in a region judged to be flat, the effect of the noise reduction processing can be reflected to a greater extent on the flat portion in each round, thus improving the efficiency of the noise reduction processing.

Further, at least one of the amount of change in the weight coefficient, the number of times the pixel value of the pixel of interest is corrected, and the amount of correction of the pixel value of the pixel of interest in each round of the correction processing is changed according to the noise level of an input image, so that processing appropriate for the noise level of the input image can be performed.

Further, since the reduced image is used for judging an edge portion and a flat portion, macroscopic judgment which is less affected by local noise is possible. As a result, the problem of the noise reduction method applying weights to surrounding pixels can be solved as follows.

Since weights and a repetition count are specified such that an isolated point is unlikely to remain in a region judged to be a flat portion, and the judgment of a flat portion is macroscopically performed, the degree to which isolated points remain can be reduced.

Further, since the repetition count and the smoothing effect in each round of repetition are reduced in an edge portion, an edge can be made less blunt.

Second Embodiment

Figure 9:
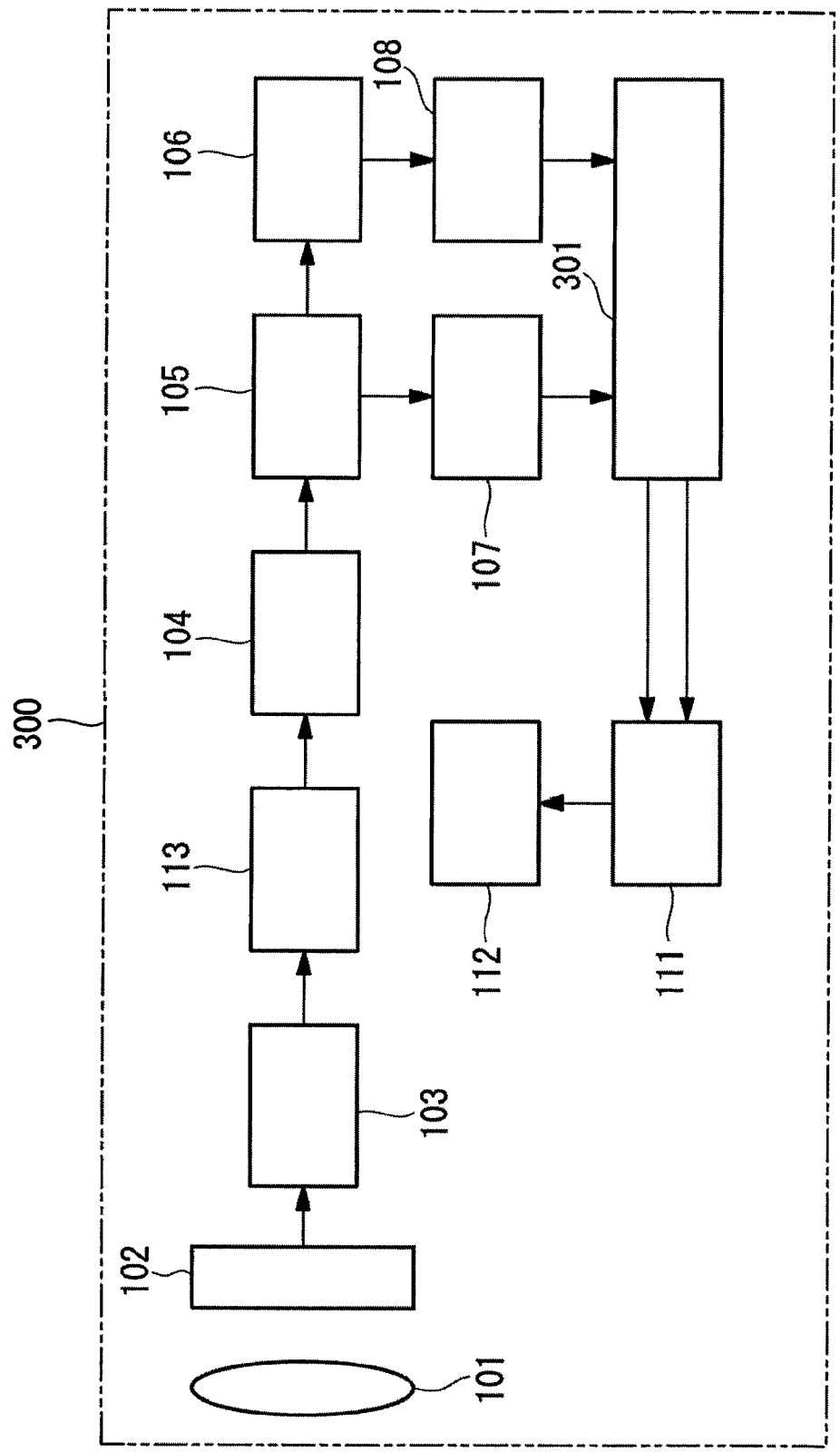
FIG. 9 is a configuration diagram of an image acquisition apparatus according to a second embodiment.

Next, a second embodiment of the present invention will be described using FIG. 9.

An image processor according to this embodiment differs from that of the first embodiment in that a noise reduction section is provided instead of the color noise reduction section and the luminance noise reduction section. In the image processor according to this embodiment, differences from the first embodiment will be mainly described and a description of similarities will be omitted. Identical numbers are assigned to the same functional sections as those of the first embodiment, and a description thereof will be omitted.

A noise reduction section 301 is obtained by combining the color noise reduction section 109 and the luminance noise reduction section 110 of the first embodiment and is connected to the color level conversion section 107, the edge enhancement section 108, and the compression section 111.

Figure 10:
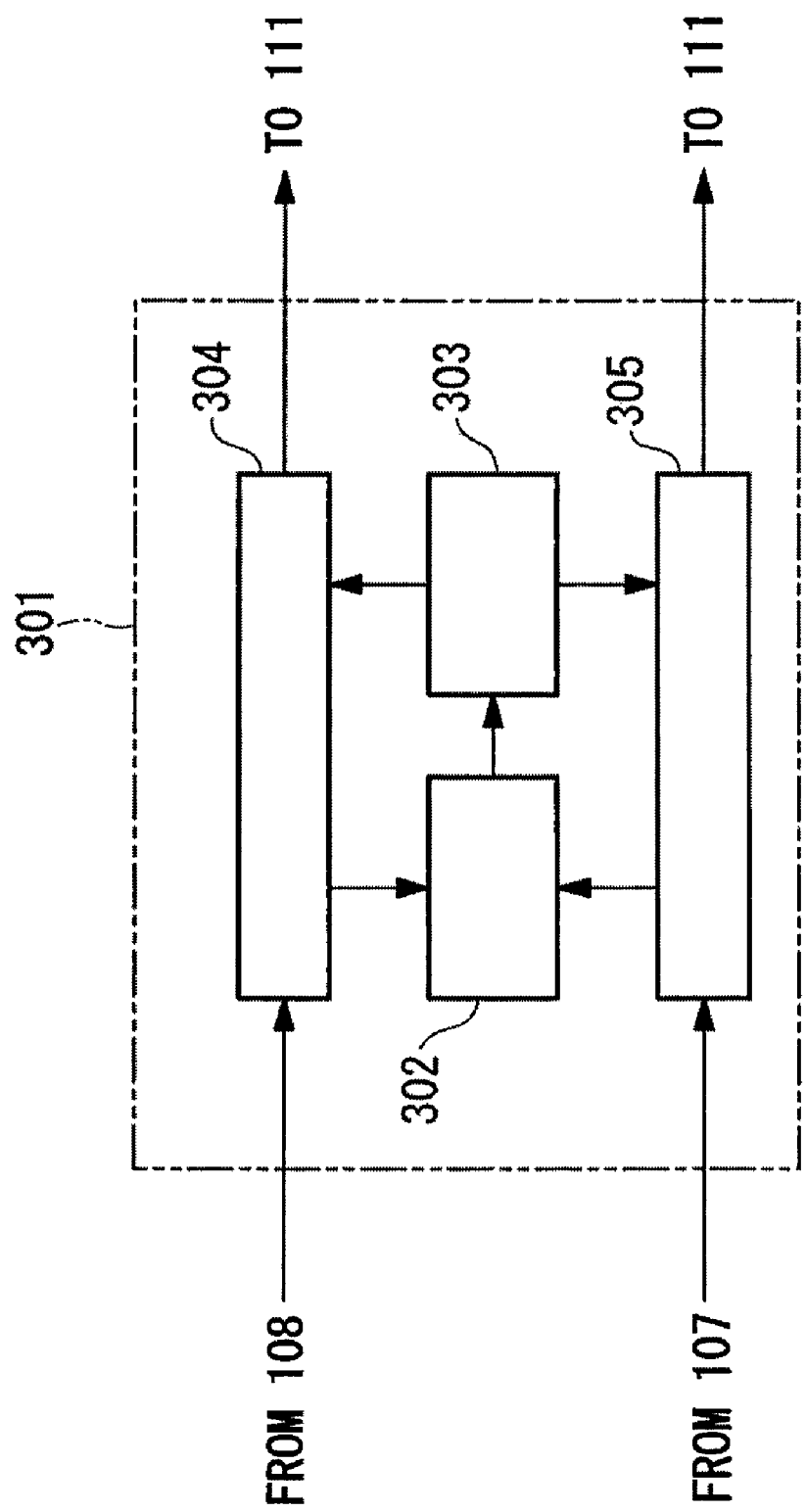
FIG. 10 is a configuration diagram of a noise reduction section shown in FIG. 9.

FIG. 10 is an internal configuration diagram of the noise reduction section 301.

The noise reduction section 301 includes a luminance noise reduction section 304, a color noise reduction section 305, a reduction section (reduction means) 302, and an edge extraction section (edge judgment means) 303. The luminance noise reduction section 304 is connected to the edge enhancement section 108, the reduction section 302, the edge extraction section 303, and the compression section 111. The color noise reduction section 305 is connected to the color level conversion section 107, the reduction section 302, the edge extraction section 303, and the compression section 111. The reduction section 302 is connected to the luminance noise reduction section 304, the color noise reduction section 305, and the edge extraction section 303.

Figure 11:
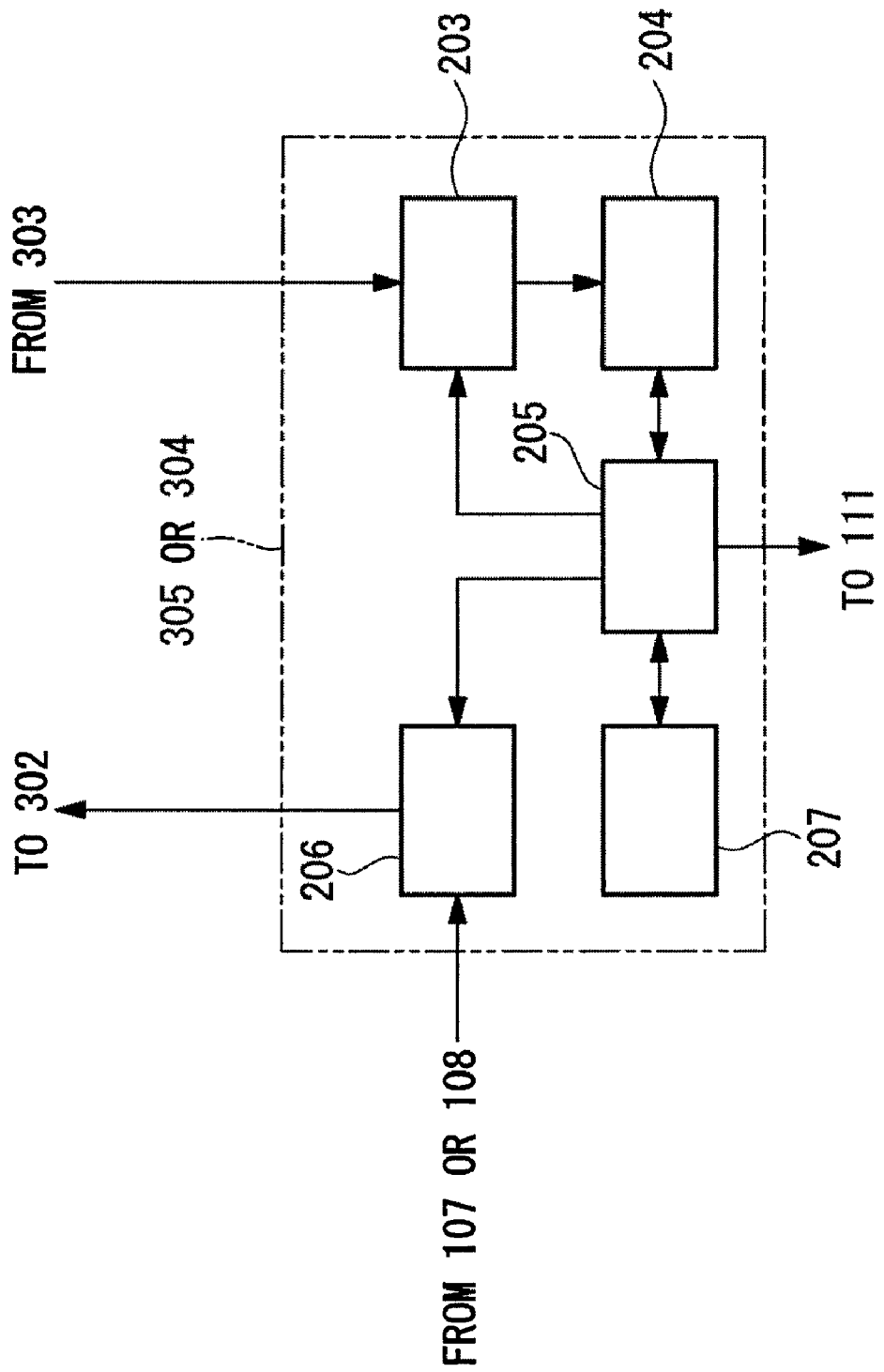
FIG. 11 is a configuration diagram of a color noise reduction section and a luminance noise reduction section shown in FIG. 10.

As shown in FIG. 11, the luminance noise reduction section 304 and the color noise reduction section 305 have the same configuration equivalent to that obtained by removing the reduction section 201 and the edge extraction section 202 from the configuration of the first embodiment, shown in FIG. 2. The same connections are also used except that the weight calculation section 203 is connected to the edge extraction section 303, and the buffer A 206 is connected to the reduction section 302.

The operation of the image processor having the above-described configuration will be described below.

Note that since the operation is the same as that of the first embodiment, except for the operation of the noise reduction section 301, the operation of the noise reduction section 301 will be described.

When the processing of the edge enhancement section 108 and the color level conversion section 107 is finished, a luminance image is accumulated in the buffer A 206 of the luminance noise reduction section 304, and a Cr image and a Cb image are accumulated in the buffer A 206 of the color noise reduction section 305. Then, the reduction section 302 first reduces the luminance image in the buffer A 206 of the luminance noise reduction section 304 and the Cr image and the Cb image in the buffer A 206 of the color noise reduction section 305, at the same reduction ratio M, and outputs them to the edge extraction section 303.

The edge extraction section 303 extracts edge components $E_y$, $E_{cr}$, and $E_{cb}$ from the reduced luminance image, Cr image, and Cb image, respectively, and calculates edge indexes $\alpha_y$, $\alpha_{cr}$, and $\alpha_{cb}$ for $E_y$, $E_{cr}$, and $E_{cb}$, respectively, by Expression (1).

Next, new color-difference edge indexes $\gamma_{cr}$ and $\gamma_{cb}$ are calculated from the relationship among the edge indexes, as follows:

$$\gamma_{cr} = \alpha_{cr} * mag(\alpha_{cr} - \alpha_y) * wgt(\alpha_y) + (1 - wgt(\alpha_y)) * \alpha_y$$

$$\gamma_{cb} = \alpha_{cb} * mag(\alpha_{cb} - \alpha_y) * wgt(\alpha_y) + (1 - wgt(\alpha_y)) * \alpha_y \quad (7)$$

Figure 12A:
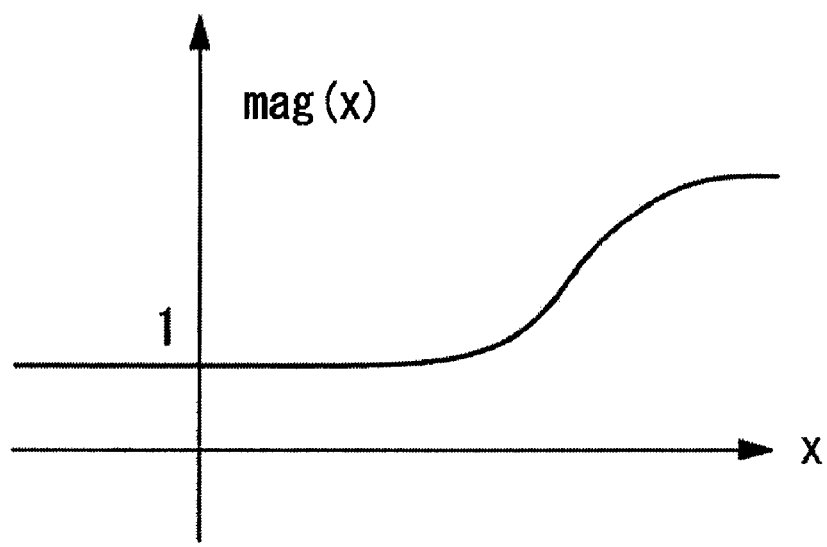
FIG. 12A is an explanatory diagram of processing for recalculating color-difference edge indexes from a luminance edge index and color-difference edge indexes.
Figure 12B:
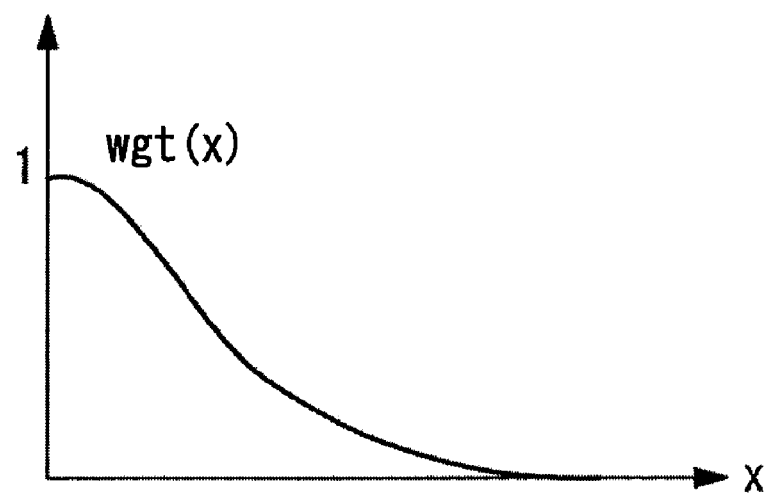
FIG. 12B is an explanatory diagram of processing for recalculating the color-difference edge indexes from the luminance edge index and the color-difference edge indexes.

Here, mag(x) and wgt(x) are functions shown in FIGS. 12A and 12B, mag(x) has a characteristic whereby it gives 1 or more with respect to large positive values and close to 1 with respect to negative values or small positive values, and wgt(x) has a monotonically decreasing characteristic.

When $\alpha_{cr}$ is larger than $\alpha_y$ to a certain extent, the edge index $\gamma_{cr}$ calculated by the above-described expression has a value larger than $\alpha_{cr}$, which is the original index, due to the effect of the function mag. As a result, in a location where the sense of resolution is maintained by color-difference information rather than luminance information, the noise reduction processing works so as to preserve the edge of the color-difference image more, resulting in maintaining the sense of resolution.

Further, when $\alpha_y$ is large to a certain extent, $\gamma_{cr}$ has a characteristic whereby it approaches the value of $\alpha_y$. In this case, the noise reduction processing works so as to preserve the edge of the color-difference image more in a location where the luminance edge is strong, resulting in preventing color blurring in the edge portion.

After the edge extraction section 303 recalculates the color-difference edge indexes in this way, the luminance noise reduction section 304 and the color noise reduction section 305 reduce noise from the luminance image and the color-difference images in the their own buffers A 206 by using the edge indexes in the edge extraction section 303. Since the operation performed at this time is the same as the operation of the luminance noise reduction section 110 in the first embodiment, a description thereof will be omitted.

As described above, according to the image processor of this embodiment, since the edge indexes of the color-difference images are calculated anew based on both the edge index of the luminance image and the edge indexes of the color-difference images, it is possible to alleviate a reduction in the sense of resolution in a portion where a luminance edge is weak and color blurring in a portion where a luminance edge is strong and to perform higher-performance noise reduction processing.

Third Embodiment

Next, a third embodiment of the present invention will be described using FIG. 13.

An image processor according to this embodiment differs in the internal configuration of the color noise reduction section from the above-described embodiments. In the image processor of this embodiment, differences from the above-described embodiments will be mainly described below, and a description of similarities will be omitted. Identical numbers are assigned to the same sections as those of the above-described embodiments, and a description thereof will be omitted.

Figure 13:
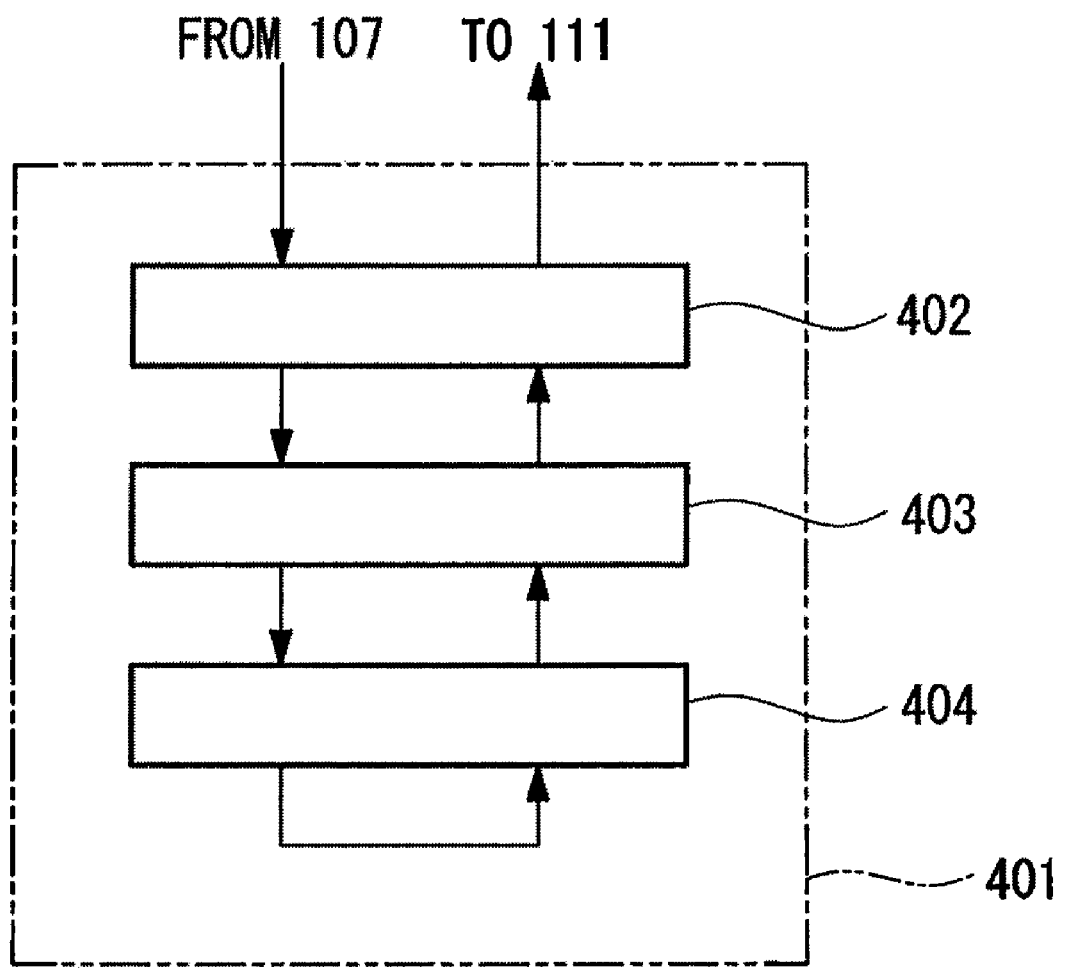
FIG. 13 is a configuration diagram of an image acquisition apparatus according to a third embodiment.

As shown in FIG. 13, in a color noise reduction section 401, noise reduction units (noise removing means) A 402, B 403, and C 404 that have the same configuration are connected.

Figure 14:
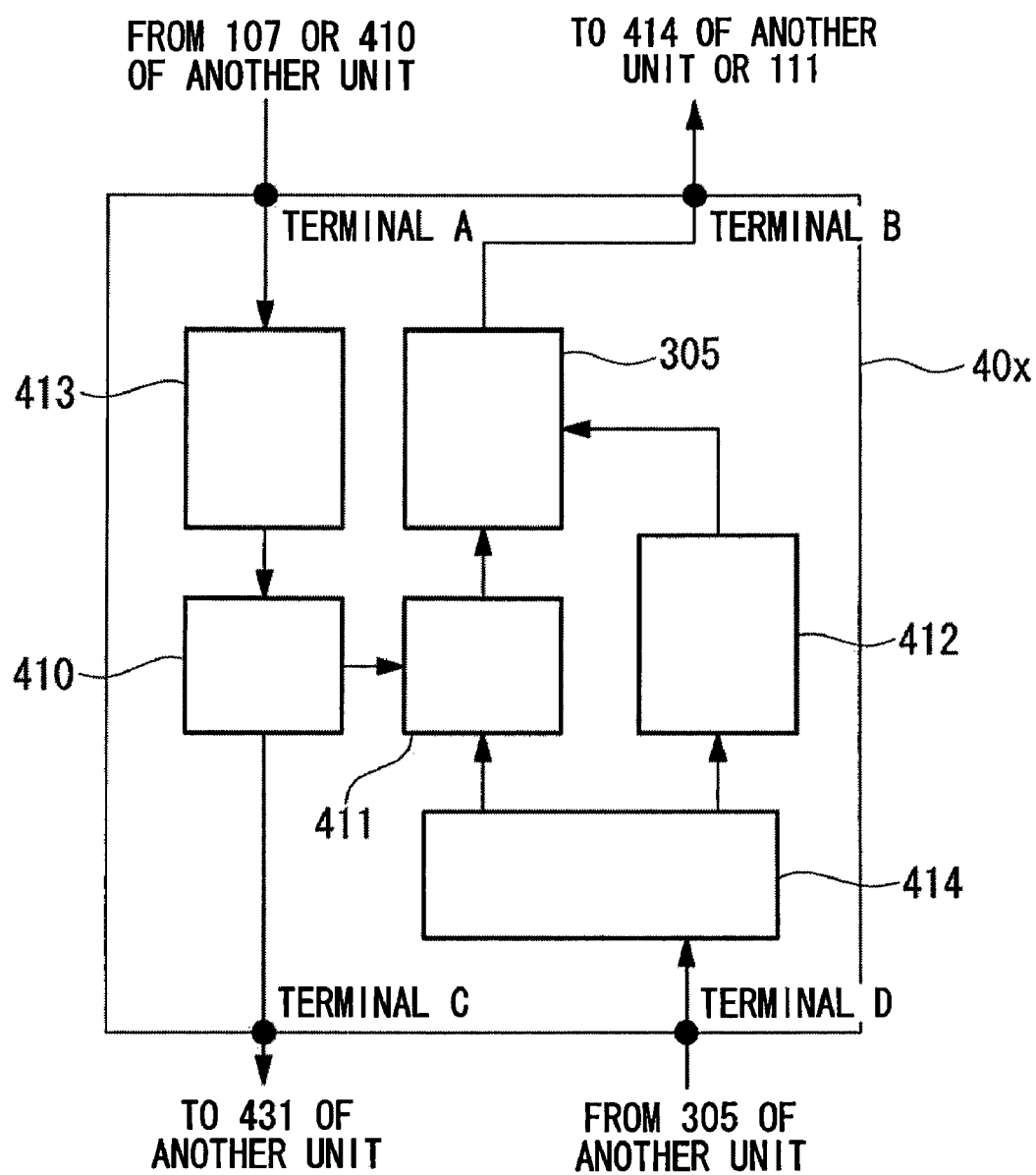
FIG. 14 is a configuration diagram of a noise reduction unit shown in FIG. 13.

The units each have the same configuration shown in FIG. 14 and include input terminals A and D and output terminals B and D. The noise reduction unit A 402 is connected to the color level conversion section 107 via the terminal A, to the compression section 111 via the terminal B, and to the terminal A and the terminal B of the noise reduction unit B 403 via the terminal C and the terminal D, respectively. The noise reduction unit B 403 is connected to the terminal C and the terminal D of the noise reduction unit A 402 via the terminal A and the terminal B, respectively, and to the terminal A and the terminal B of the noise reduction unit C 404 via the terminal C and the terminal D, respectively. The noise reduction unit C 404 is connected to the terminal C and the terminal D of the noise reduction unit B 403 via the terminal A and the terminal B, respectively, but the terminal C and the terminal D are connected to each other.

FIG. 14 shows the internal configuration of each of the units.

Each of the units includes a reduction section 410, a combining section 411, an edge extraction section 412, and a color noise reduction section 315. A buffer 413 is connected to the outside via the terminal A, and a buffer 414 is connected to the outside via the terminal D. The reduction section 410 is connected to the buffer 413 and the combining section 411 and outputs an image to the terminal C. The combining section 411 is connected to the buffer 414, the reduction section 410, and the color noise reduction section 315. The edge extraction section 412 is connected to the buffer 414 and the color noise reduction section 315. The color noise reduction section 315 is connected to the combining section 411 and the edge extraction section 412 and outputs an image to the outside via the terminal B.

The operation of the color noise reduction section 401 will be described below.

First, the noise reduction unit shown in FIG. 14 will be described.

When an image to be subjected to noise reduction is received from the terminal A, the noise reduction unit reduces the received image, outputs the reduced image to the terminal C without performing the noise reduction processing, and enters a standby state. Then, when an image is received from the terminal D, the standby state is released, and an image corresponding to the image previously received from the terminal A and subjected to noise reduction is output from the terminal B. Here, the image received from the terminal D needs to be an image corresponding to the image previously output from terminal C and subjected to noise reduction by some means.

When an image Z (composed of two images, i.e., a Cr image and a Cb image) to be subjected to noise reduction is received from the terminal A, Z is first accumulated in the buffer 413. Next, the reduction section 410 reduces Z at a magnification ratio M and outputs it to the terminal C. At the same time, a residual image Dz (including one Cr image and one Cb image) is calculated by subtracting an image obtained by reducing Z at the magnification ratio M and then reversely enlarged at M times from Z and is output to the combining section 411. The combining section 411 holds the residual image and waits for an input from the terminal D.

When an image L (including two images, i.e., a Cr image and a Cb image) is received from the terminal D, the image L is first accumulated in the buffer 414. Next, the edge extraction section 412 applies edge detection to each of the Cb image and the Cr image of the image L by a known method, calculates the edge indexes $\alpha_{cr}$ and $\alpha_{Cb}$ for the image L by the method shown in Expression (1) in the first embodiment, and holds them therein. At the same time, the combining section 411 adds the residual image Dz held therein to L enlarged at the magnification ratio M to generate a new image L' (including two images, i.e., a Cr image and a Cb image) and outputs it to the color noise reduction section 315.

The color noise reduction section 315 accumulates L' received from the combining section 411 in its buffer A 206. Then, the same processing as in the second embodiment is performed based on the edge indexes $\alpha_{cr}$ and $\alpha_{cb}$ held in the edge extraction section 412 as the edge indexes, and the processing result is output to the outside via the terminal B.

Next, the operation of the color noise reduction section 401 will be described.

When a Cr image $Cr_1$ and a Cb image $Cb_1$ are received from the color level conversion section 107, the noise reduction unit A 402 generates images $Cr_2$ and $Cb_1$ by reducing $Cr_1$ and $Cb_1$ at the predetermined magnification ratio M, outputs them to the noise reduction unit B 403 via the terminal C, and enters a standby state.

The noise reduction unit B 403 generates images $Cr_3$ and $Cb_3$ by reducing $Cr_2$ and $Cb_2$ at the predetermined magnification ratio M, outputs them to the noise reduction unit C 404 via the terminal C, and similarly enters a standby state.

The noise reduction unit C 404 outputs, from the terminal C, images $Cr_4$ and $Cb_4$ obtained by reducing $Cr_3$ and $Cb_3$ at the predetermined magnification ratio M but does not enter a standby state because the terminal C is directly connected to the terminal D of the noise reduction unit C 404. Processing is immediately performed, and images $Cr_3'$ and $Cb_3'$ obtained by applying noise reduction to $Cr_3$ and $Cb_3$ are output to the noise reduction unit B 403 via the terminal B.

Thus, the noise reduction unit B 403 releases the standby state and outputs $Cr_2'$ and $Cb_2'$, which are the results of noise reduction applied to $Cr_2$ and $Cb_2$ using $Cr_3'$ and $Cb_3'$, to the noise reduction unit A 402 via the terminal B.

Thus, the noise reduction unit A 402 similarly releases the standby state and outputs the final results of noise reduction applied to $Cr_1$ and $Cb_1$ using $Cr_2'$ and $Cb_2'$ to the compression section 111 via the terminal B.

As described above, according to the image processor of this embodiment, since noise reduction is applied to the reduced images in three steps, images from which even low-frequency noise is removed can be obtained. Further, since each noise reduction unit performs edge detection for the reduced images that have been subjected to noise reduction, to generate the edge indexes, an edge portion and a flat portion are judged as being less affected by noise, and the noise reduction performance in the overall processing is improved.

Furthermore, by performing coring processing at the time of edge detection, the effect of noise on edge judgment can be alleviated by simple processing.

Furthermore, by performing noise reduction processing through multiresolution conversion, the effect of noise on edge judgment can be significantly alleviated.

Note that although the three identical noise reduction units are used in this embodiment, a configuration in which one unit is repeatedly used can also be realized.

What is claimed is:

1. An image processor comprising:
   an edge judgment section that judges whether an edge exists in a predetermined region specified by a pixel of interest and surrounding pixels of the pixel of interest;
   a difference calculation section that calculates differences in pixel value between the pixel of interest and the surrounding pixels in the predetermined region;
   a weight coefficient calculation section that calculates weight coefficients for the respective surrounding pixels from the differences calculated by the difference calculation section, according to a judgment result of the edge judgment section;
   a weighted averaging section that calculates a weighted average value of the surrounding pixels by using the weight coefficients calculated by the weight coefficient calculation section; and
   a correction section that corrects the pixel value of the pixel of interest at least one time based on the weighted average value of the surrounding pixels calculated by the weighted averaging section, the pixel value of the pixel of interest, and the judgment result of the edge judgment section.

2. An image processor according to claim 1, wherein the edge judgment section comprises a reduction section for reducing an input image to generate a reduced image and judges, in the reduced image generated by the reduction section, whether an edge exists in a predetermined region specified by a pixel of interest and surrounding pixels of the pixel of interest.

3. An image processor according to claim 1, wherein the weight coefficient calculation section increases the amount of change in the weight coefficients with respect to the differences calculated by the difference calculation section, in a region judged to be an edge by the edge judgment section, and reduces the amount of change in the weight coefficients with respect to the differences, in a region judged to be flat by the edge judgment section.

4. An image processor according to claim 3, wherein the weight coefficient calculation section calculates the weight coefficients by combining a weighting function having a small amount of change with respect to the differences and a weighting function having a large amount of change with respect to the differences, according to a judgment result of the edge judgment section.

5. An image processor according to claim 1, wherein the weight coefficient calculation section calculates the weight coefficients by amplifying the magnitudes of the differences, according to a result judged to be an edge by the edge judgment section.

6. An image processor according to claims 1, wherein the correction section reduces the number of times the pixel value of the pixel of interest is corrected, in a region judged to be an edge by the edge judgment section, and increases the number of times the pixel value of the pixel of interest is corrected, in a region judged to be flat by the edge judgment section.

7. An image processor according to claims 1, wherein the correction section reduces the amount of correction of the pixel value of the pixel of interest in each iteration of correction processing, in a region judged to be an edge by the edge judgment section, and increases the amount of correction of the pixel value of the pixel of interest in each round of correction processing, in a region judged to be flat by the edge judgment section.

8. An image processor according to claims 3, wherein at least one of the amount of change in the weight coefficients, the number of times the pixel value of the pixel of interest is corrected, and the amount of correction of the pixel value of the pixel of interest in each round of correction processing is changed according to a noise level of the input image.

9. An image processor according to claims 5, wherein at least one of the amount of change in the weight coefficients, the number of times the pixel value of the pixel of interest is corrected, and the amount of correction of the pixel value of the pixel of interest in each round of correction processing is changed according to a noise level of the input image.

10. An image processor according to claims 6, wherein at least one of the amount of change in the weight coefficients, the number of times the pixel value of the pixel of interest is corrected, and the amount of correction of the pixel value of the pixel of interest in each round of correction processing is changed according to a noise level of the input image.

11. An image processor according to claims 7, wherein at least one of the amount of change in the weight coefficients, the number of times the pixel value of the pixel of interest is corrected, and the amount of correction of the pixel value of the pixel of interest in each round of correction processing is changed according to a noise level of the input image.

12. An image processor according to claims 1, wherein the edge judgment section judges whether an edge exists in the predetermined region, based on a luminance edge index indicating the presence of a luminance edge and a color-difference edge index indicating the presence of a color-difference edge.

13. An image processor according to claim 12, wherein the edge judgment section judges that an edge exists in the predetermined region when the color-difference edge index is equal to or more than a predetermined value and increases the color-difference edge index when the luminance edge index is equal to or less than a first threshold, and the color-difference edge index is equal to or more than a second threshold.

14. An image processor according to claim 12, wherein the edge judgment section judges that an edge exists in the predetermined region when the color-difference edge index is equal to or more than a predetermined value and increases the color-difference edge index when the luminance edge index is equal to or more than a third threshold.

15. An image processor according to claims 1, wherein the edge judgment section comprises a noise removing section for removing noise in the reduced image generated by the reduction section.

16. An image processor according to claim 14, wherein the noise removing section removes noise by coring processing.

17. An image processor according to claim 15, wherein the noise removing section reapplies, to a reduced image of an input image, processing performed by the edge judgment section, the difference calculation section, the weight coefficient calculation section, the weighted averaging section, and the correction section, thereby removing noise in the input image.

18. An image processor according to claim 1, wherein the correction section comprises a correction section for correcting luminance of the pixel of the interest and a correction section for correcting color-difference of the pixel of the interest.

19. A non-transitory computer-readable recording medium having an image processing program stored thereon which controls a computer to execute functions comprising:
   edge judgment processing of judging whether an edge exists in a predetermined region specified by a pixel of interest and surrounding pixels of the pixel of interest;
   difference calculation processing of calculating differences in pixel value between the pixel of interest and the surrounding pixels in the predetermined region;

weight coefficient calculation processing of calculating weight coefficients for the respective surrounding pixels from the differences calculated by the difference calculation processing, according to a judgment result of the edge judgment processing;

weighted average processing of calculating a weighted average value of the surrounding pixels by using the weight coefficients calculated by the weight coefficient calculation processing; and correction processing of correcting the pixel value of the pixel of interest at least one time based on the weighted average value of the surrounding pixels calculated by the weighted average processing, the pixel value of the pixel of interest, and the judgment result of the edge judgment processing.

* * * * *